Patented July 24, 1928.

1,678,354

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

PROCESS OF RAYON MANUFACTURE.

No Drawing.   Application filed July 13, 1926.   Serial No. 122,272.

This invention relates to the manufacture of rayon from solutions of cellulose derivatives and has for its object to provide a method of reducing the viscosity of such solutions for spinning into satisfactory rayon filaments. More especially, this invention aims to provide a method of reducing the viscosity of viscose or aqueous cellulose xanthate solutions to a point suitable for the manufacture of a good grade rayon, and thus to make available for commercial usage certain high " viscosity " raw materials heretofore considered inferior and unsatisfactory.

For preparing a good grade rayon, it is necessary to employ a raw material high in alpha cellulose and of suitably low " viscosity ". The alpha cellulose content of the raw material is one factor which determines the quality and yield of the product, and accordingly the non-alpha cellulose content or impurities, such as resin, lignin, gum and ash, affect the quality and color of xanthate solution and when present in excessive amount may discolor the xanthate solution to such an extent that a dark, practically unbleachable rayon is produced therefrom. A low " viscosity " raw material permits preparation of a xanthate solution of proper cellulose concentration and may produce a suitable filament. It also permits the xanthate solution to be forced through the very fine orifices of a spinneret without difficulty.

A high " viscosity " pulp results in a high-viscosity xanthate solution. A change in the usual viscose process to lessen de-polymerization of the alpha cellulose of the usual pulp also results in a high viscosity solution. Thus, by the usual viscose process a standard pulp employed for rayon manufacture is first uniformly treated with the proper amount of caustic soda and is then allowed to age or season for about 48 hours. It is then treated with the required amount of carbon bisulphide to convert it into cellulose xanthate, after which a xanthate solution of 7% cellulose concentration is formed. This solution is allowed to " ripen " for, say, about 60 to 70 hours, whereupon it is forced through the orifices of spinnerets to form the rayon filaments. If the aging time of the soda-treated pulp or soda cellulose is decreased to five to six hours, for example, and the soda cellulose xanthated and then dissolved to form a xanthate solution of the usual 7% cellulose concentration, the viscosity of such solution will be materially higher than usual. Increase in the cellulose concentration of the xanthate solution also results in an increased viscosity. Decrease in caustic soda concentration of the xanthate solution also results in an increased viscosity. Thus it will be seen that the term " viscosity " as applied to pulp or other form of cellulose is an arbitrary one and is descriptive of the viscosity of solution which may be prepared therefrom. Pulp having a " viscosity " of, say, 10 arbitrary units may be converted into the xanthate solution, which should have a viscosity of approximately twice that of a solution derived from pulp having a viscosity of 5 arbitrary units, if both solutions were prepared under the same and standard conditions. The viscosities of the xanthate solutions will depart from these values, however, if the conditions maintained in their preparation are varied from usual or standard procedure.

The rayon industry has preferred pulp of a uniform " viscosity " to permit the preparation by the usual standard procedure of a xanthate solution of about 7% cellulose concentration of such low viscosity that it may be forced through the very fine orifices of a spinneret without difficulty.

I have found that the disadvantages incident to the use of the usual xanthate solution having a viscosity higher than that considered satisfactory for rayon manufacture may be eliminated in a simple and satisfactory manner if the solution is rapidly heated to the proper extent immediately before spinning. This effects a reduction of the viscosity of the xanthate solution in accordance with the well-known principle that heating reduces the viscosity of a liquid. It should be observed, however, that such heating of the solution must take place rapidly, and immediately before spinning, inasmuch as a coagulation of regenerated cellulose takes place if the heating is prolonged or is effected considerably before spinning, as during the ripening period.

Rapid heating of the xanthate solution immediately before spinning may be readily accomplished in carrying out the usual viscose process for the manufacture of rayon. In the usual process, the ripened xanthate solution or syrup is introduced into a storage tank or reservoir, which is maintained under air pressure averaging, say, about 20 pounds per square inch gauge, from which it is forced through a pipe into a metering pump of the gear or piston type, which is operated to deliver a certain predetermined volume of syrup through a pipe to the spinneret, which is submerged below the level of a setting bath in which the rayon filament is set into regenerated cellulose. A heating unit may be placed in this system at any suitable point prior to the formation of the rayon filament. The unit is preferably placed in or about the pipe connecting the metering pump and spinneret, immediately before the spinneret, but may be placed before the pump, or formed as part of the spinneret. For example, a jacket through which a suitable heating medium, such as steam, hot water, or oil, may be passed, may be arranged about a suitable point in the system before the spinneret; or an electric unit may be incorporated in a part of the spinneret; or a removable electric heating unit may be inserted in the pipe immediately before the spinneret, and thus directly transfer heat to the syrup as it passes thereby. In case of a removable device, if local overheating, which may cause a coagulation of regenerated cellulose, takes place, the device may be removed and cleaned. However constructed or arranged, the heating means is designed to heat the syrup almost instantaneously to a temperature at which its viscosity is proper for spinning. Inasmuch as the amount and rate of syrup flow through the spinneret is very low, almost instantaneous heating of the syrup to reduce its viscosity to the desired extent without appreciable coagulation of regenerated cellulose may be readily accomplished in practice. Experimental data indicates that the viscosity of a comparatively viscous xanthate solution may be reduced to one-third of its original value without appreciable coagulation, by heating such solution rapidly to a temperature of about 60° to 70° C. immediately before spinning. The setting bath may be maintained at the desired operating temperature, say, 25° to 40° C. by removing the heat transferred thereto by the heated xanthate solution as it is delivered thereinto from the spinneret. This may be accomplished by any suitable means, as by arranging a cooling or refrigerating jacket about the setting tank.

The present invention, therefore, make possible the reduction of xanthate solutions of high viscosities to approximately the standard viscosity values at which the usual commercial spinning machine is designed to give optimum results. Furthermore, with the usual machine, xanthate solutions heretofore considered too viscous to handle and to produce a suitable product may be utilized to produce a good grade product which may be even stronger than the usual product. Also, a pulp of low "viscosity" may be used in greater than usual cellulose concentration in xanthate solution, to produce a stronger product.

Having thus described this invention, it is evident that various changes might be resorted to without departing from the spirit or scope of invention as defined by the appended claims.

What I claim is:

1. In the manufacture of rayon, a process which comprises heating without appreciable coagulation an aqueous solution of a cellulose derivative to reduce its viscosity immediately prior to spinning it, while so heated spinning such solution into filaments, and delivering the filaments into a setting bath.

2. In the manufacture of rayon, a process which comprises rapidly heating an aqueous solution of a cellulose derivative to reduce its viscosity immediately prior to spinning it, spinning such solution while so heated into filaments, and delivering the filaments into a setting bath.

3. In the manufacture of viscose-rayon, the process which comprises rapidly heating an aqueous solution of cellulose xanthate immediately prior to spinning it, spinning such solution while so heated into filaments, and delivering the filments into a setting bath.

4. In the manufacture of viscose-rayon, a process which comprises rapidly heating an aqueous solution of cellulose xanthate to a temperature of about 60° to 70° C. immediately prior to spinning it, spinning such solution while so heated into filaments, and delivering the filaments into a setting bath.

5. In the manufacture of viscose-rayon, a process which comprises heating an aqueous solution of cellulose xanthate without appreciable coagulation of regenerated cellulose, immediately spinning the solution into filaments, and delivering the filaments into a setting bath.

6. In the manufacture of rayon, a process which comprises rapidly heating an aqueous solution of a cellulose derivative to reduce its viscosity immediately prior to spinning it, spinning such solution while so heated into filaments, delivering the filaments into a setting bath, and maintaining the setting bath at a temperature considerably below the temperature of the filaments delivered thereto.

7. In the manufacture of viscose-rayon, a process which comprises rapidly heating an aqueous solution of cellulose xanthate to reduce its viscosity immediately prior to spinning it, spinning such solution while so heated into rayon filaments, delivering the filaments into a setting bath, and maintaining the setting bath at a temperature considerably below the temperature of the filaments delivered thereinto.

In testimony whereof I have affixed my signature.

GEORGE A. RICHTER.